FREE RADICAL DIRECT POSITIVE PHOTOCOPY PROCESS

Filed Nov. 13, 1970

ROBERT H. SPRAGUE
JUERGEN H. H. KELLER
INVENTOR.

BY

ATTORNEY

United States Patent Office 3,764,319
Patented Oct. 9, 1973

3,764,319
FREE RADICAL DIRECT POSITIVE PHOTOCOPY PROCESS

Juergen H. H. Keller and Robert H. Sprague, Chelmsford, Mass., assignors to Itek Corporation, Lexington, Mass.

Continuation-in-part of abandoned application Ser. No. 658,425, Aug. 4, 1967. This application Nov. 13, 1970, Ser. No. 89,535
Int. Cl. G03c 7/00
U.S. Cl. 96—3 15 Claims

ABSTRACT OF THE DISCLOSURE

A process for producing direct positive photocopies by exposure of a supported light-sensitive composition to imaging light to produce a negative image copy, transfer of unexposed portions of the composition to a transfer sheet, and exposure of the transfer sheet to light to produce the positive copy. The light-sensitive compositions, which produce color on exposure to light without further development, comprise a dye base such as styryl, cyanine or merocyanine in combination with an activator compound such as carbon tetrabromide. Monochromatic and multi-layer full-color prints can be produced.

CROSS REFERENCE TO RELATED APPLICATIONS

This application is a continuation-in-part of Keller et. al., Ser. No. 658,425, filed Aug. 4, 1967.

BACKGROUND OF THE INVENTION

(1) Field of the invention

The present invention relates to a photocopy process for the production of direct positive photocopies employing a free-radical color-forming system.

(2) Description of the prior art

U.S. Patents 3,100,703; 3,102,810 and 3,109,736 disclose certain photosensitive compositions comprising a styryl, cyanine, or merocyanine dye base in combination with a halogen compound, which compositions are useful for producing colored print-out photographic images. According to the disclosure in these patents, a light-sensitive composition comprising such a dye base and organic halogen compound can be exposed to light through a photographic negative for the production of a print-out image.

Many other free-radical light-sensitive systems have also been disclosed in the prior art. Some of these will be referred to infra.

SUMMARY OF THE INVENTION

According to the present invention, photosensitive compositions of the type comprising styryl, cyanine, and merocyanine dye bases and organic halogen compounds are employed for the direct production of positive photocopies by first exposing a layer of the light-sensitive composition to the image to be copied, whereby a negative image is produced in the light-sensitive layer, and then transferring unreacted portions of the light-sensitive layer to a transfer sheet. Color formation to produce a positive copy of the image in the transfer sheet is achieved by exposing the transfer sheet to light or by the use of suitably mordanted transfer sheets. Multi-layer full-color positive prints of colored images such as positive transparencies can be prepared, as will be described below.

The free-radical color-forming compositions employed in the present invention form images immediately upon exposure without development. By appropriate selection of one or more dye bases for inclusion in the compositions, the copying process can be made panchromatic, i.e. capable of copying all colors. Unlike thermographic processes, the process of the present invention can discriminate colors. Further, monochromatic images formed by the process can be one of a variety of colors, including black, depending on the dye base or bases employed. The process is capable of producing direct positive prints of images having large black areas which cannot suitably becopied by xerographic processes because of "edge effects." Finally, the transfer process involved in the present invention is extremely rapid in comparison with conventional transfer processes for producing direct positives. For example, the transfer processes of the present invention generally require only a few seconds and are substantially complete on contact of a transfer sheet with an exposed light-sensitive material. Prior art processes relying on the diffusion of silver salts generally require 15–30 seconds' contact. Prior art dye transfer techniques such as "Polacolor" the Eastman dye transfer process or Technicolor imbibition process require one to two minutes.

BRIEF DESCRIPTION OF THE DRAWINGS

The figures illustrate the exposure and transfer of a light-sensitive system of this invention to produce polychromic prints.

DESCRIPTION OF THE PREFERRED EMBODIMENTS

Figures 1, 1A:
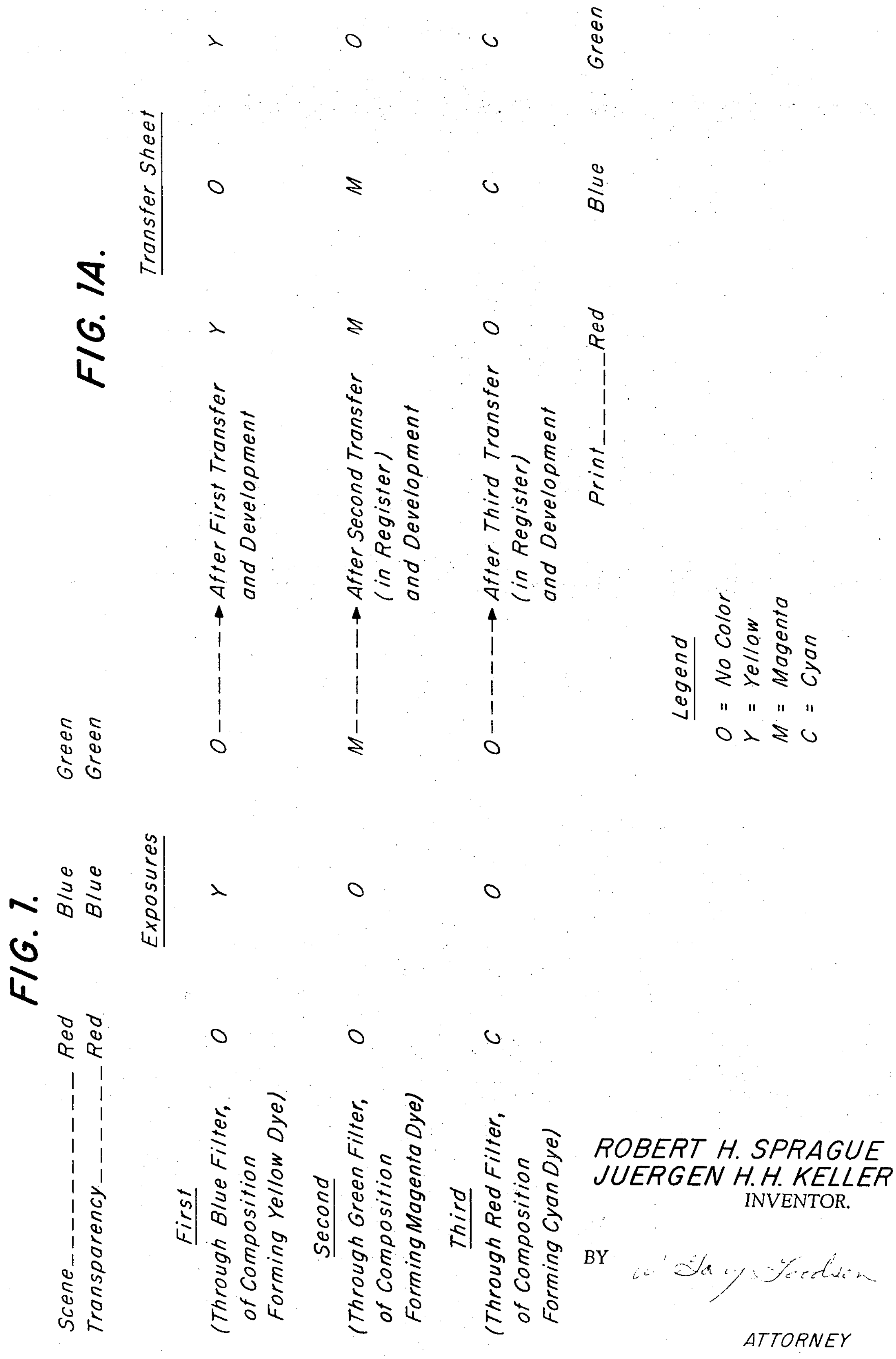

In a broad embodiment, the process of this invention is useful with free-radical photographic systems which produce print-out images upon exposure to actinic radiation. These photographic systems include at least a dye base and an activator compound which acts, upon exposure to convert, the dye base to a colored dye image.

The patent literature contains descriptions of many of these systems. Some representative examples include: furfurylidenes and primary aromatic amines and lower halohydrocarbons (U.S. Pats. 3,394,391 and 3,394,394; British patent specification 1,093,724); ferrocene derivatives and iodoform (British patent specification 1,056,-768); acridine, cyanine, merocyanine or styryl compounds with photoactivators comprising halogenated organic sulfoxides or sulfono compounds (Netherlands patent application 6614847); bis(p-aminophenyl)vinyl carbonium polymethine dyes in their leuco form with halogen-containing substances (U.S. Pat. 3,275,442); linear polyketones with hydrogen halide precursors (U.S. Pat. 3,268,-333); polymers of cyclopentadienes or cyclohexadienes with halogenated methyl activators (U.S. Pat. 3,201,240; British patent specification 1,056,767); combinations of a halogenated hydrocarbon, an indole, a ferrocene, and an aldehyde (U.S. Pat. 3,422,206); azoaniline or azomethine dyes with halogen-containing compounds capable of producing free radicals (U.S. Pat. 3,503,744); organic azide compounds with coupler compounds (U.S. Pat. 3,282,693); leucocyanine dyes combined with organic heterocyclic compounds which generate bifunctional coupling intermediates upon exposure (U.S. Pat. 3,285,743); acid addition salts of substituted leucocyanide triphenylmethanes with metal perchlorates (U.S. Pat. 3,418,128); sulphazides with aromatic dye-forming compounds (British patent specification 1,094,288); colorless, oxidizable nitrogen-containing, organic color generators together with photo-oxidants and reducing agents (U.S. Pat. 3,390,995); leuco forms of dyes with diacylazino compounds (U.S. Pat. 3,364,030); leuco forms of dyes with N,N,O-triacylhydroxylamine (U.S. Pat. 3,359,-109); leuco forms of dyes with aromatic bitriazoles (U.S. Pat. 3,360,370); N-acyl-amino-phenoxazines, phenothiazines or dihydrophenazines together with non-volatile nitrogen-containing photo-oxidants (U.S. Pat. 3,395,018); aromatic amines with organic halogen-containing activators (U.S. Pats. 3,042,515 and 3,042,516); N-vinyl compounds with organic halogen generating activators (U.S. Pats. 3,042,517, 3,042,518 and 3,042,519); styryl dye bases with organic halogen-containing compounds (U.S. Pat. 3,095,303); cyanine dye bases and organic halogen-containing compounds (U.S. Pat. 3,100,703); merocyanine dye bases and organic halogen-containing compouds (U.S. Pat. 3,102,027); colorless leuco dihydroanthracenes with either organic halogen or sulfur compounds (U.S. Pat. 3,342,595); etc. The above list is intended to be representative of the broad number of print-out photographic systems formed from dye bases and activating compounds which can be used with the present invention. This listing is not intended to be all inclusive.

The preferred color-forming systems for use in this invention are those systems formed from styryl, cyanine, or merocyanine dye bases together with free radical generating organic halogen compounds.

Numerous styryl, cyanine, and merocyanine dye bases and light-sensitive free radical generating compounds suitably employed in the direct positive photocopy process of the present invention are disclosed in some of the aforementioned U.S. patents which are incorporated herein by reference. For example, suitable styryl dye bases are those of the formula

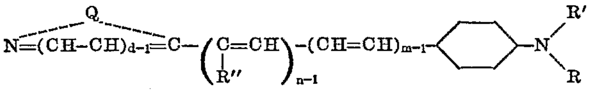

wherein R and R′ are lower alkyl or benzyl, and may be the same or different; R″ is —H or —CN; *d* and *n* are each 1 or 2, *m* is a positive integer not greater than 4; the sum of *n*—1 and *m*—1 is not greater than 4; and Q represents the non-metallic atoms (i.e C, O, S, Se, and N) necessary to complete a heterocyclic nucleus.

Suitable cyanine dye bases are those of the formula

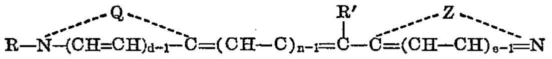

wherein D and *e* are each 1 or 2; *n* is an integer from 1 to 4; R is alkyl, aralkyl, or aryl; R′ is —H or —CN; and Q and Z represent the non-metallic atoms necessary to complete a heterocyclic organic nucleus having five or six atoms in the ring.

Suitable merocyanine dyes are those of the formula

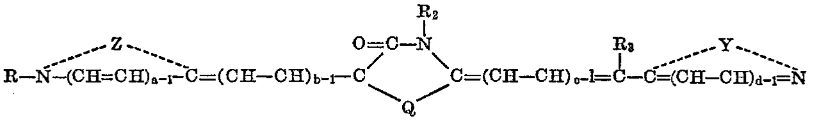

wherein R is lower alkyl or benzyl, $R_2$ is lower alkyl, aryl, or benzyl; $R_3$ is —H or —CN, *a* is 1 or 2; *b* is an integer from 1 to 3; *c* is an integer from 1 to 3; *d* is 1 or 2; Y and Z each represent the necessary non-metallic carbon, sulfur, selenium, oxygen, or nitrogen atoms necessary to complete a heterocyclic organic nucleus containing five or six members in the ring; Q is oxygen, sulfur, selenium, or

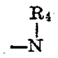

wherein $R_4$ is lower alkyl, aryl, or benzyl. Numerous dye bases of these types are disclosed in the aforementioned patents, together with a description of their preparation and properties.

Although any of these dye bases can be used according to the present invention, the reddish dye base 3-ethyl-5-[(3- ethyl - 2(3H) - benzothiazolylidene)-ethyl-idene]-(2-quinolylmethylene)-4-thiazolidone

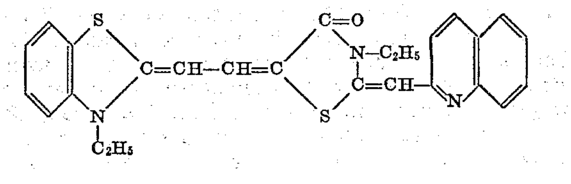

is especially useful, since on exposure to light in the presence of a free radical generating compound a black salt-like dye is formed. Direct positives produced using this black dye are of particular utility.

he light-sensitive free-radical generating organic halogen compounds preferably used in the light-sensitive compositions of the present invention are also disclosed in the aforementioned patents and have the formula $RCX_3$, wherein R is a monovalent radical which may be hydrogen, chlorine, bromine, iodine, alkyl, haloalkyl, aryl, aroyl, or aralkyl, wherein each X is chlorine, bromine, or iodine, and wherein not all of the X's need be the same. A variety of compounds falling within this category is disclosed in the patents and includes $CCl_4$, $CBr_4$, $CHCl_3$, $CHI_3$, $CBrCl_3$, $C_2Cl_6$, $CH_2Br_5$, $C_6H_5CBr_3$, and

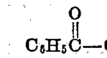

Of these materials, carbon tetrabromide has proved of particular utility since it can be easily incorporated into light-sensitive films or coatings and gives sensitive systems in combination with the merocyanine dye basis.

Although the organic halogen compounds just disclosed can be employed alone or in combinations with dye bases to produce light-sensitive compositions useful according to the present invention, it has proved desirable to include certain colorless non-toxic organic sulfur compounds such as those taught in U.S. Pat. 3,285,944 in the compositions. These additives function as accelerators, stabilizers, and color intensifiers.

The sulfur compounds include: disulfides and hydrosulfides of the formula RSSR and RSH wherein R is the heterocyclic nucleus of a type common in cyanine chemistry; disulfides of the formula

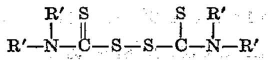

where R′ is H, lower alkyl, or aryl; sulfides having sulfide sulfur attached to a carbon atom in a heterocyclic ring in which the same carbon atom is attached to two atoms other than carbon; thioureas; and acyclic thioacetanilides. These activators include heterocyclic mercaptans such as 2-quinoline, 4-quinoline, 2-pyridine, 4-pyridine, imidazole, benzimidazole, thiazole, benzothiazole, β-naphthothiazole, oxazole, benzoxazole, β-naphthoxazole, selenazole, benzoselenazole, thiazoline, rhodanine, tetrazole, etc. A preferred material is 2-mercapto-benzothiazole.

The light-sensitive compositions of the present invention may be imbided directly into absorbent films or may be coated onto an appropriate substrate, usually in the presence of a suitable binder. Thus, the compositions of the present invention, dissolved in a non-polar solvent such as benzene, have been imbibed directly into "Mylar" films having an absorptive coating of cellulose acetate-butyrate thereon. Alternatively, the light-sensitive materials can be formulated into a coating composition with a solvent and a film-forming binder material such as polystyrene or polyvinyl chloride and then used to coat a substrate material such as paper, wood, foil or plastic.

In the coatings prepared in this fashion, the dye base, the organic halogen compound, and the sulfurous accelerator (if present) are usually employed in amounts such that the dye base is present in an amount from 0.001 to 1.0 part by weight, the free radical generating organic halogen compound is present in an amount of 0.1 to 10.0 parts by weight, and the accelerator is present in an amount of from 0.001 to 1.0 part by weight per part by weight of film-forming plastic within the resultant sensitized coating. Variation of the proportions within the ranges indicated would depend on the sensitivity sought in the coating, the intensity of the color desired in the final print, the intensity of the light source used for exposure, and the combination of dye base and free radical generator employed in a particular case, all of which is evident to and within the knowledge of one skilled in the photographic arts.

On exposure to light of a film or sheet sensitized with a composition of the type described, a monochromatic negative image will be formed substantially instantaneously within the film or sheet. To produce a monochromatic positive according to the present invention, the unreacted composition is next transferred from the film or sheet to a transfer sheet by bringing the transfer sheet and exposed light-sensitized sheet into contact in the presence of an agent preferentially dissolving the unreacted materials. In general, the dye bases and free-radical generating materials contemplated in the present invention are soluble in non-polar solvents such as benzene, toluene, xylene and other liquid aromatic hydrocarbons, in aliphatic hydrocarbons such n-hexane, n-heptane, and petroleum spirits, in cycloaliphatic hydrocarbons such as cyclopentane and cyclohexane, and in heterocyclic materials such as dioxane and the like. The dyes formed when the dye bases react on exposure to light in the presence of a free radical generator are, in contrast to the dye bases, salts or salt-like materials only difficulty soluble in the non-polar materials just described. Hence, these non-polar solvents are suitable agents for the preferential transfer of unreacted light-sensitive composition to a transfer sheet without transfer of the salt-like dye product formed on exposure. The solvents can be used alone, in admixture with one another, or combined with smaller amounts of other more polar materials such as acetone.

The transfer sheet need not be saturated with the transfer agent in order to effect transfer of the unreacted dye base. Indeed, the mere moistening of the interface between the the transfer sheet and exposed sheet, generally accomplished by moistening the surface of the transfer sheet, is usually sufficient to transfer unreacted light-sensitive composition to the transfer sheet. After transfer of unreacted light-sensitive compositions to the transfer sheet, a monochromatic positive image can be formed from some color systems in the transfer sheet by exposure to light. This can be effected by a separate exposure station in apparatus for practicing the photocopy process, or the image may simply be developed on exposure to sunlight or room light without a further deliberate exposure step. In view of the sensitivity of the compounds, exposure to room light or sunlight produces a positive image in the transfer sheet after only a short period of time.

Alternatively, a mordanted transfer sheet can be used to produce the positive dye image with other color systems. Those skilled in the art, will of course, be able to determine the best type of mordant for each particular color-forming system. Representative mordanted sheets are described in detail in U.S. Pats. 3,305,361 and 3,503,-744.

The production of multi-layer full-color prints according to the present invention is illustrated in the accompanying drawing which schematically shows the reproduction of a positive transparency of a scene comprising red, blue, and green elements.

As shown in FIG. 1 of the drawing, a first exposure is made to the transparency through a blue filter employing a sensitized sheet capable of forming a yellow dye image on exposure. Unreacted dye base is then transferred to a transfer sheet in a first transfer step (FIG. 1A) and, when exposed to light, will form a yellow dye image in the transfer sheet.

A second sensitized sheet bearing a dye base composition forming a magenta image on exposure to light is next exposed to imaging light through a green filter. In a second transfer step, the unexposed composition is then transferred in register to the transfer sheet already containing the material from the first transfer step.

Finally, a third exposure is made through a red filter employing a sensitized sheet forming a cyan dye image on exposure. The unreacted cyan dye base is transferred to the transfer sheet in register with the materials already present. On development by exposure to light, the full-color print is complete.

It will be understood that the photographic system of this invention can also be used in a multi-layer system wherein only one exposure followed by one dye transfer step is necessary to produce a full-color print.

A better understanding of the present invention and of its many advantages will be had by referring to the following specific examples, given by way of illustration.

EXAMPLE 1

A solution was prepared by dissolving 125 parts by weight of 3 - ethyl - 5 - [(3-ethyl-2(3H)-benzothiazolylidene) - ethylidene] - 2 - (2 - quinolylmethylene)-4-thiazolidone and 25 parts by weight of 2-mercaptobenzothiazole, in about 6,000 parts by weight of methylene chloride. An equal volume of benzene was added to this solution and 1575 parts by weight of $CBr_4$ were dissolved therein. The solution was filtered and coated directly on a "Mylar" film having an absorbent coating of cellulose acetate butyrate thereon.

The resulting sensitized film was exposed to a positive image for one minute using a photoflood lamp. A negative of the image appeared immediately within the sensitized film. Unreacted light-sensitive material from unexposed areas of the film were then transferred in a period of about five seconds to paper moistened with a mixture comprising one part by volume of acetone and four parts by volume of petroleum ether. The transfer sheet was then exposed to light from a photoflood lamp for approximately five seconds to produce a positive black copy of the original image in the transfer sheet.

Generally, a number of positive copies may be made in this manner before the supply of unreacted light-sensitive composition is exhausted by the transfer process.

If desired, a plastic binder such as polystyrene can be combined with the solution described earlier herein in an amount of about 10% by weight to give a composition useful for coating paper or other substrates to light-sensitize them. A 10% solution of polyvinyl chloride in tetrahydrofuran is also a good coating vehicle for the light-sensitive mixtures of the invention.

EXAMPLE 2

Twenty five parts by weight of 2-[3-(3-ethyl-2(3H) benzoxazolylidene)propenyl] quinoline and 50 parts by weight of 2-mercaptobenzothiazole were dissolved in about 3,200 parts by weight of acetone. An equal volume of a 10% solution of polystyrene in benzene was combined with this solution. Fourteen hundred parts of carbon tetrabromide were then dissolved in the mixture, which, after filtering to remove undissolved solids, was coated onto a "Mylar" substrate. After drying, a light-sensitive sheet forming a magenta dye on exposure to light was obtained. (Alternatively, an equivalent amount of 3-ethyl - 5 - (3 - ethyl - 2(3H) - benzothiazolylidene)-2 - (4 - quinolylmethylene)-4-thiazolidone can be used as the dye base for forming a magenta image.)

A second light-sensitive sheet was prepared in the same fashion, but using 2-p-dimthylamino-styryl-benzimidazole as the dye base. The sheet formed a yellow dye on exposure to light.

A third light-sensitive sheet was prepared using 4-[3-(3 - ethyl - 2(3H) - benzothiazolylidene)propenyl]quinoline as the dye base. This sheet formed a cyan dye on exposure.

The three sheets were separately exposed to the same positive color image through a green, blue and red filter respectively. After each exposure, unreacted dye base was transferred, in register, to the same transfer sheet by contacting the transfer sheet with the exposed light-sensitive layer after moistening the transfer sheet with a 4:1 mixture of petroleum ether and acetone.

The transferred dye bases, which can be developed by exposure of the transfer sheet to light after each transfer step or after the transfer is complete, combine by addition to reproduce the original color image.

What is claimed is:

1. In the method for producing a photocopy by exposing a supported free-radical light-sensitive composition comprising a dye base and an activator compound, the improvement for producing a direct positive photocopy of an image which comprises exposing said composition to imaging light whereby a negative of said image is produced therein, transferring by diffusion unexposed portions of said composition to a transfer sheet in the presence of a transfer agent comprising a non-polar solvent for the dye base and activator, and converting said transferred composition to a positive color image in said transfer sheet.

2. An improvement of claim 1 wherein said positive color image in the transfer sheet is formed by exposing said transfer sheet to light.

3. An improvement of claim 2 wherein said dye base is selected from the group consisting of styryl, cyanine, and merocyanine dye bases.

4. An improvement of claim 3 wherein said activator compound comprises a free-radical generating organic halogen-containing compound.

5. A improvement of claim 4 wherein said light-sensitive composition is absorbed into a supporting substrate.

6. An improvement of claim 4 wherein said light-sensitive composition is present in a coating on a supporting substrate.

7. An improvement of claim 4 wherein said transfer agent comprises a non-polar hydrocarbon solvent for said dye base and said organic halogen-containing compound.

8. An improvement of claim 7 wherein said light-sensitive composition additionally contains a colorless non-toxic organic sulfur compound.

9. An improvement of claim 8 wherein said dye base comprises a styryl dye base.

10. An improvement of claim 8 wherein said dye base comprises a cyanine dye base.

11. An improvement of claim 8 wherein said dye base comprises a merocyanine dye base.

12. An improvement of claim 11 wherein said merocyanine dye base comprises 3-ethyl-5-[(3-ethyl-2(3H)-benzothiazolylidene) - ethylidene] - 2 - (2 - quinolylmethylene)-4-thiazolidone.

13. An improvement of claim 12 wherein said free radical generating organic halogen-containing compound comprises carbontetrabromide.

14. An improvement of claim 13 wherein said colorless non-toxic organic sulfur compound comprises 2-mercaptobenzothiazole.

15. An improvement of claim 1 wherein a multi-layer full-color print is prepared by separately exposing three light-sensitive compositions, respectively forming a yellow, magenta, and cyan dye on exposure, to the same color image through a blue, green, and red filter respectively, transferring unexposed portions of said compositions to a transfer sheet in register, and exposing said transfer sheet to light to develop the transferred unexposed portions.

References Cited

UNITED STATES PATENTS

| | | | |
|---|---|---|---|
| 3,222,171 | 12/1965 | Land | 96—28 |
| 3,173,787 | 3/1965 | Clement et al. | 96—28 |
| 1,028,810 | 9/1963 | Sprague et al. | 96—90 R |
| 1,028,810 | 9/1963 | Spargue et al. | 96—90 R |
| 3,106,466 | 10/1963 | Sprague et al. | 96—90 R |
| 2,668,113 | 2/1954 | Schwalenstocker | 96—52 |
| 3,246,984 | 4/1966 | Nagy | 96—29 |

NORMAN G. TORCHIN, Primary Examiner

J. L. GOODROW, Assistant Examiner

U.S. Cl. X.R.

96—29; 101—464